United States Patent [19]

Yoshida et al.

[11] Patent Number: 4,843,546
[45] Date of Patent: Jun. 27, 1989

[54] POS SYSTEM WITH MEANS FOR AUTOMATICALLY RECONFIGURING THE CENTER PLU AND LOCAL FILES

[75] Inventors: Kazufumi Yoshida, Hadano; Tohru Ishikawa, Isehara; Mikio Nogami, Hadano, all of Japan

[73] Assignee: Hitachi, Ltd., Tokyo, Japan

[21] Appl. No.: 35,754

[22] Filed: Apr. 8, 1987

[30] Foreign Application Priority Data

Apr. 9, 1986 [JP] Japan .................................. 61-79918

[51] Int. Cl.$^4$ ............................................. G06F 15/24
[52] U.S. Cl. ..................................... 364/403; 364/404
[58] Field of Search .................................. 364/403–404

[56] References Cited

U.S. PATENT DOCUMENTS

| | | | |
|---|---|---|---|
| 4,186,438 | 1/1980 | Benson | 364/200 |
| 4,398,250 | 8/1983 | Hosono | 364/404 |

FOREIGN PATENT DOCUMENTS 3404948  8/1985  Fed. Rep. of Germany ... 177/25.15

Primary Examiner—Jerry Smith
Assistant Examiner—Gail Hayes
Attorney, Agent, or Firm—Fay, Sharpe, Beall, Fagan, Minnich & McKee

[57] ABSTRACT

A representative one of a plurality of POS terminals is provided with a center PLU file and a local PLU file, and each of the POS terminals is provided with a local PLU buffer which holds a copy of the local PLU file. The local PLU file contains merchandise codes, merchandise names and unit prices of well-selling merchandise. The center PLU file contains information on other merchandise. When merchandise is sold at one of the POS terminals, the number of sales of the merchandise is stored. After the store is closed, the stored numbers of times of merchandise are read, and if the number of times of sales of the merchandise whose information is stored in the center PLU file is smaller than that of merchandise whose information is stored in the local PLU file, the merchandise information are exchanged between the center PLU file and the local PLU file.

18 Claims, 3 Drawing Sheets

FIG. 2A

| MERCHANDISE CODE | MERCHANDISE NAME | UNIT PRICE | NUMBER OF MERCHANDISE SOLD |
|---|---|---|---|
| 201 | 202 | 203 | 204 |

| REFERENCE COUNT | MERCHANDISE CODE | MERCHANDISE NAME | UNIT PRICE |
|---|---|---|---|
| 205 | | | |

| MERCHANDISE CODE | MERCHANDISE NAME | UNIT PRICE | NUMBER OF MERCHANDISE SOLD |
|---|---|---|---|
| | | | 206 |

| MERCHANDISE CODE | MERCHANDISE NAME | UNIT PRICE | NUMBE OF MERCHANDISE SOLD |
|---|---|---|---|
| | | | 207 |

| MERCHANDISE CODE | MERCHANDISE NAME | UNIT PRICE |
|---|---|---|

~37, 47

POS SYSTEM WITH MEANS FOR AUTOMATICALLY RECONFIGURING THE CENTER PLU AND LOCAL FILES

BACKGROUND OF THE INVENTION

The present invention relates to a POS system, and more particularly to a price look-up (PLU) file management system suitable to a scanning system.

A POS terminal installed at a point of sales issues a chit on which detail of merchandise which a customer purchased is printed. The detail printed on the chit includes not only merchandise codes but also names of merchandise and unit prices thereof for better understanding by the customer. Since the merchandise codes are inputed by a cashier through a keyboard or by a bar code, the POS terminal must have a file which manages the correspondence of the merchandise codes to merchandise names and unit prices thereof. This file is called a PLU file which is a table which allows retrieval of a merchandise name and a unit price by using the merchandise code as a key.

In a prior art POS system having the PLU file, the PLU files are provided in a register terminal and a host device as shown in JP-A-59-57368.

When merchandise which is not listed in the PLU file of the register terminal is to be transacted, an on-line query to the host device is made and the transaction is done at the register terminal based on the result of the retrieval of the PLU file of the host device.

However, this is very troublesome. In another proposal, a PLU file for all merchandise is provided in one of the POS terminals and the PLU file is divided into two hierarchy files, a local PLU which stores frequently referenced merchandise information and a center PLU which stores other merchandise information. In this system, file reconfiguration between the local PLU and the center PLU is controlled manually or other device such as a host computer. This is inconvenient in operation in retail stores in which well-selling merchandise vary day by day.

SUMMARY OF THE INVENTION

It is an object of the present invention to provide means for automatically reconfiguring the center PLU and the local PLU in accordance with well-selling merchandise which vary day by day.

In accordance with the present invention, the local PLU file and the center PLU file are provided on a disk of a representative POS terminal, and a copy of the local PLU file is stored in a memory of each of other POS terminals.

A record of the center PLU file to which an access request has been issued by any of the POS terminals is held in a buffer on the memory of the representative POS terminal, and the record stored in the buffer is used for subsequent access request to that record. In this manner, the number of times of access to the disk is reduced.

The merchandise in the local PLU buffer and the center PLU buffer are compared at a predetermined occasion, and if there is merchandise whose number of times of sales registered in the center PLU buffer is larger than that stored in the local PLU buffer, it is exchanged so that the number of times of access to the disk is further reduced.

BRIEF DESCRIPTION OF THE DRAWINGS

FIGS. 2A to 2E show record formats of file and buffer in the embodiment.

DESCRIPTION OF THE PREFERRED EMBODIMENTS

One embodiment of the present invention is explained with reference to FIGS. 1 and 2.

Figure 1:
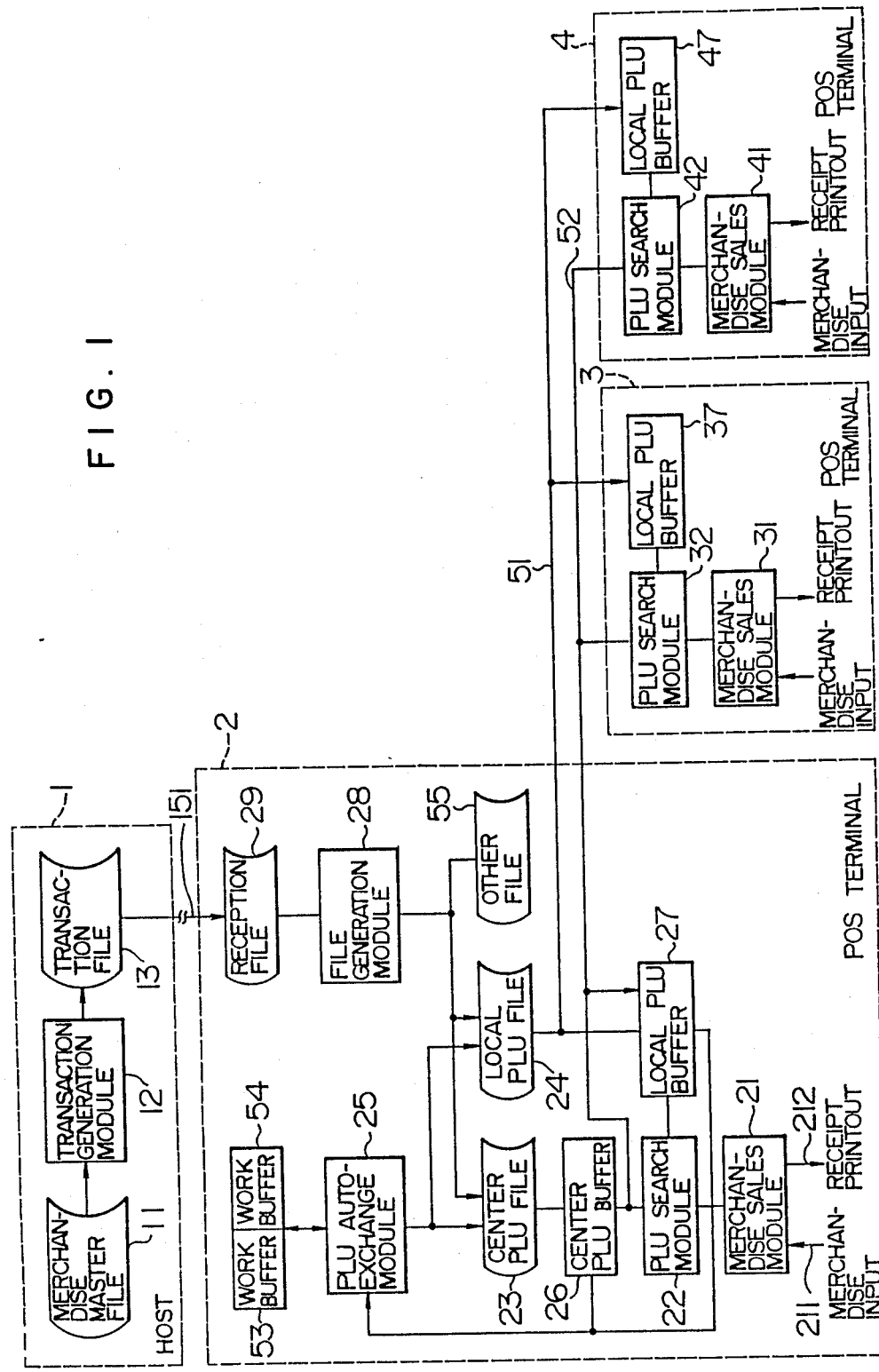
FIG. 1 shows a functional module chart in one embodiment of the present invention.

FIG. 1 shows a merchandise data file (PLU) and a POS system incorporating the PLU.

The system shown in FIG. 1 is divided into a group 1 processed by a host computer and groups 2, 3 and 4 processed by POS terminals.

A merchandise master file 11 contains all merchandise data handled in the POS terminals and it is a basic file in the POS system. A transaction generation module 12 selects PLU data to the POS terminals from the merchandise master file 11 and stores it into a transaction file 13. The content of the transaction file 13 is transmitted to a reception file 29 in the POS terminal through a communication line 51.

The file generation module 28 generates and updates the files in the POS terminal in accordance with the content of the reception file 29. The files in the POS terminal 2 include a center PLU file 23, a local PLU file 24, and operator manage file and terminal manage file shown as "other files 55" in FIG. 1. Those files are stored on a disk unit.

The center PLU file 23 and the local PLU file 24 are not provided in all POS terminals but centrally provided in the representative POS terminal 2.

The local PLU file 24 contains well-selling merchandise data of all merchandise PLU data, and each of the POS terminals 2, 3 and 4 hold copies thereof in local PLU buffers 27, 37 and 47. The center PLU file 23 holds all other merchandise data. The local PLU buffers 27, 37 and 47 may be high speed semiconductor memories.

FIGS. 2A-2E show records in the files and buffers.

FIG. 2A shows a record in the center PLU file 23. The record comprises merchandise code 201, merchandise name 202, unit price 203 and historical total number of merchandise sold 204.

FIG. 2B shows a record in the center PLU buffer 26. It is a copy of the record in the center PLU file 23 but it does not have the total number of merchandise sold 204 but instead has a count to indicate the number of times of access to the record.

FIG. 2C shows a record in the local PLU file 24. It has the same format as the record in the center PLU file 23. It holds data of better-selling merchandise than those stored in the center PLU file 23.

FIG. 2D shows a record in the local PLU buffer 27. It is a copy of the record in the local PLU file 24 but the number of merchandise sold 207 is cleared to zero at an initial time (for example, open time of the store).

FIG. 2E shows a record in the local PLU buffers 37 and 47. It is also a copy of the local PLU file 24 but does not have the number of merchandise sold 206.

Copying of data from the local PLU file 24 to the local PLU buffers 27, 37 and 47 is done every morning prior to the transaction, through a line 51. Because the POS terminals 2, 3 and 4 have their own local PLU buffers 27, 37 and 47, the number of times of access to the local PLU file 24 through a line 52 at the time of registration of merchandise is reduced, and the competition in accessing the local PLU file 24 is reduced.

The merchandise sales modules 21, 31 and 41 have ECR functions in the respective POS terminals 2, 3 and 4. It receives a merchandise code and the number of merchandise sold (through a line 211), receives merchandise information such as a merchandise price, a merchandise name and merchandise sales information from a PLU search module 22, 32 or 42, and print them out on a receipt through a line 212.

The PLU search modules 22, 32 or 42 searches the local PLU buffers 27, 37 or 47 by the merchandise code received from the merchandise sales modules 21, 31 or 41, and if there are PLU data in the corresponding local PLU 27, 37 or 47, it receives the PLU data as merchandise information. If there is no PLU data in the local PLU buffers 27, 37 or 47, it searches the center PLU buffer 26 or the center PLU file 23 in the representative POS terminal 2. If there is PLU data, it receives the PLU data as merchandise information.

The number of merchandise sold inputted to the merchandise sales module 21, 31 or 41 is accumulated in the number of merchandise sold 207 and 204 (FIGS. 2D and 2A) of the record in which the PLU data of the corresponding merchandise of the local PLU buffer 27 or center PLU file 23 is stored, through the PLU search module 22, 32 or 42 and a line 52. Namely, if there is corresponding merchandise data in the local PLU buffer 27, 37 or 47, the number of merchandise sold is accummulated in the local PLU file 24, and if there is no corresponding merchandise data, the number is accummulated in the center PLU file 23. In this manner, the numbers of merchandise sold in all POS terminals 2, 3 and 4 are stored in the local PLU buffer 27 and the center PLU file 23. The local PLU buffer 27 holds the total number of merchandise sold since the store open time.

Since the center PLU file 23 is held in the representative POS terminal 2 as the central file, access requests from more than one POS terminal may compete. In the present invention, in order to accelerate a response to the competing access, a center PLU buffer 26 in a high speed memory is provided in addition to the center PLU file 23 in the disk. The access request to the center PLU file 23 first refers to the buffer 26, and if it does not hit, it accesses the disk in which the center PLU file 23 is stored. In order to reduce the number of times of access to the disk, the buffer 26 is managed such that it always contains those data which have most frequently been accessed.

Such management may be performed in the following manner. When an access request is issued by the PLU search module 22, 32 or 42, the center PLU buffer 26 is first referenced. If there is PLU data of the corresponding merchandise in the center PLU buffer 26, the reference count of the record in which the PLU data of that merchandise is stored is incremented by one. If there is no such PLU data in the center PLU buffer 26, the center PLU file 23 is referenced. The merchandise code, merchandise name and unit price read from the center PLU file 23 are stored into the record of the center PLU buffer 26. If there is no vacant record in the center PLU buffer 26, the reference counts 205 (FIG. 2B) of the records in the center PLU buffer 26 are examined, and the PLU data read from the center PLU file 23 is read into the record having the smallest reference count. The number of records in the PLU buffer 26 may be several tens to several hundreds, and the most frequently accessed data are always stored therein.

Figure 3:
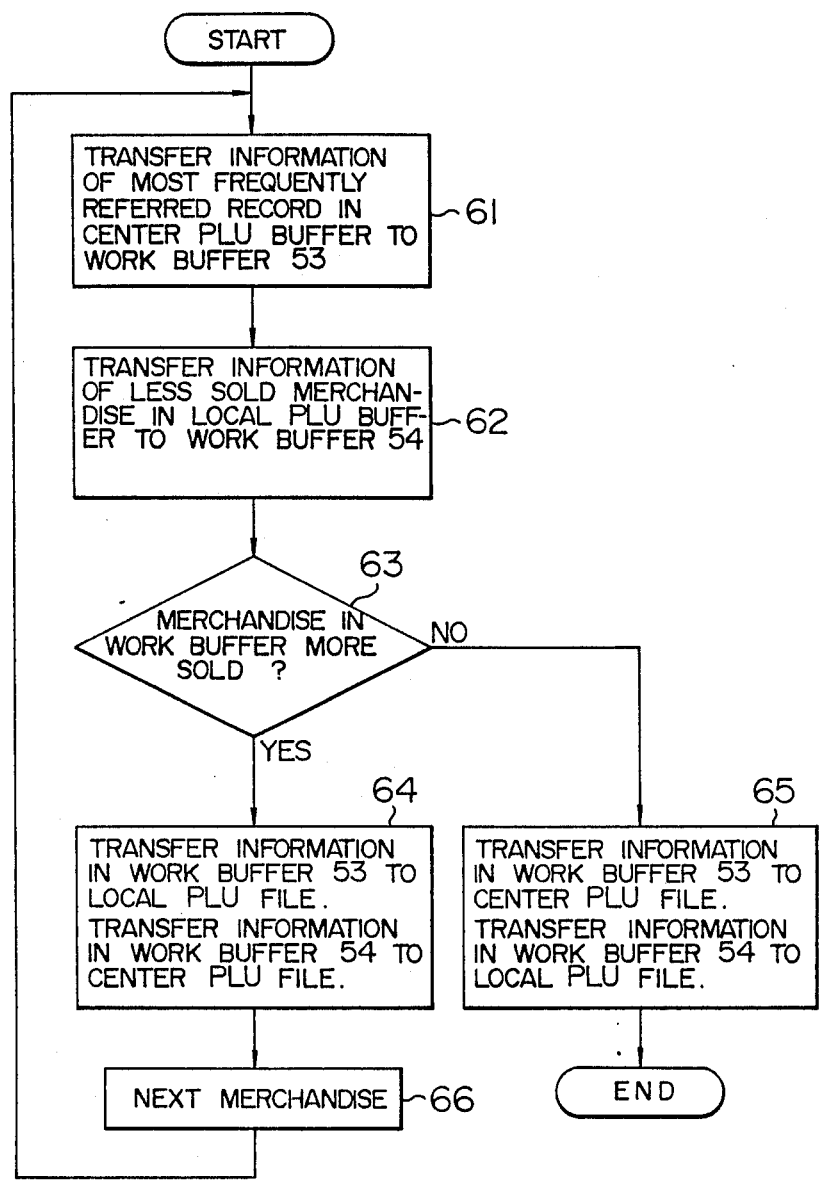
FIG. 3 shows a process flow chart of the embodiment.

After the end of a particular day's transaction, the number of merchandise sold in the local PLU buffer 27 is accumulated to the local PLU file 26. A PLU automatic exchange module 25 is activated to carry out the exchange shown in FIG. 3. The reference count 205 of the center PLU buffer 26 is examined and the record information of the most frequently referred merchandise is registered in the work buffer 53 (step 61). The number of merchandise sold 207 in the local PLU file 24 or local PLU buffer 27 is examined, and the record information of the least sold merchandise is registered in the work buffer 54 (step 62). The record information in the work buffers 53 and 54 are compared (step 63), and the PLU data of the most frequently referred merchandise in the center PLU buffer is moved from the center PLU file 23 to the local PLU file 23. Since the center PLU buffer holds the number of times of reference while the local PLU buffer holds the number of merchandise sold, they should be appropriately compared. On the other hand, the merchandise data in the local PLU file concerning the merchandise which is not sold in volume is moved from the local PLU file 24 to the center PLU file 23 (step 64). The same step is repeated for the next merchandise (step 66). If the comparison shows that the merchandise in the local PLU buffer has been sold more, the exchange is terminated and the contents of the work buffers are restored (step 65).

On the following day, the updated information in the local PLU file is copied into the local PLU buffers of the POS terminals prior to the transaction.

In accordance with the present invention, a large volume of merchandise data can be quickly retrieved in the POS system, and the selection of the merchandise data, which has been heretofore done manually or by a host computer, can be automatically carried out.

In accordance with the present invention, in the merchandise managing in which well-selling items vary from day to day, the PLU file in the POS terminal is divided into the center PLU file and the local PLU file and yet the management of those files is optimized and simplified. Accordingly, the present invention offers a significant advantage in the operation of the POS system.

We claim:

1. A POS system having POS terminals and hierarchy merchandise files comprising:
a first POS terminal including,
  a center file means for holding merchandise data representative of merchandise codes and merchandise names of items within a first group of merchandise,
  a local file means for holding merchandise data representative of merchandise codes and merchandise names of items within a second group of merchandise,
  a first counter means for holding first count data representative of a frequency of sales of items within the first group of merchandise, and
  a second counter means for holding second count data representative of a frequency of sales of items within the second group of merchandise;
a plurality of second POS terminals, each including,
  a local buffer means for holding a copy of said local file means,
  means for searching at least one of said local buffer means or said center file means based on an externally inputted merchandise code to retrieve a merchandise name corresponding to the externally inputted merchandise code, and means for communicating data representative of a sale of a selected item of one of said first and second groups of merchandise to said first POS terminal, means for incrementing the first count data of said first counter means when the selected item belongs to the first group of merchandise, and means for incrementing the second count data of said second counter means when the selected item belongs to the second group of merchandise; and said first POS terminal further including, registration means for selectively comparing said first count data and said second count data, the registration means including means for selectively updating said local file means with data representative of sales of merchandise in the first group of merchandise in the event that an item in the first group of merchandise has a larger frequency of sales than that of an item in the second group of merchandise as a result of a comparison of said first and second count data, and means for selectively communicating data within the local file means to the local buffer means of each of the plurality of second POS terminals.

2. The POS system according to claim 1 wherein said center file means and said local file means are on disk units.

3. The POS system according to claim 2 wherein said local buffer means is comprised of a semiconductor memory.

4. The POS system according to claim 1 wherein the registration means further includes means for selectively updating said center file means with data representative of sales of items in the second group of merchandise in the event that an item in the second group of merchandise has a smaller frequency of sales than that of an item in the first group of merchandise as a result of a comparison of said first and second count data.

5. The POS system according to claim 1 wherein said first POS terminal further includes:

a center buffer means for holding a copy of said center file means; and retrieval means for searching said center buffer means in accordance with the means for searching of the second POS terminal;

the retrieval means further including means for searching said center file means if no corresponding merchandise code is found in said center buffer means.

6. The POS system according to claim 5 wherein said first POS terminal further includes means for registering date representative of merchandise retrieved from said center file means by said retrieval means into said center buffer means.

7. The POS system according to claim 6 wherein said first POS terminal further includes means for selectively deleting, in accordance with the first count data, merchandise data registered in said center buffer means representative of items having a small frequency of sales; and means for registering merchandise data, representative of retrieved merchandise, into said center buffer means.

8. The POS system according to claim 1 wherein the first POS terminal further includes:

means for generating a count signal representative of a frequency of sales of items in at least one of said first and second groups of merchandise in accordance with a number of accesses of at least one of said center file means and said local buffer means by said plurality of second POS terminals.

9. The POS system according to claim 1 wherein the first POS terminal further includes:

means for generating a count signal representative of a frequency of sales in accordance with a number of items sold at each POS terminal.

10. The POS system according to claim 1 wherein said first POS terminal further includes an additional local buffer means for holding a copy of said local file means, and means for searching at least one of said additional local buffer means and said center file means based on an externally input merchandise code to retrieve a merchandise name which corresponds to the merchandise code.

11. A method of point of sale merchandise data inquiry management comprising the steps of:

storing, in a first POS terminal, first merchandise data representative of merchandise codes and merchandise names of items within a first group of merchandise;

storing, in the first POS terminal, second merchandise data representative of merchandise codes and merchandise names of items within a second group of merchandise;

storing, in the first POS terminal, first count data representative of a frequency of sales of items within the first group of merchandise;

storing, in the first POS terminal, second count data representative of a frequency of sales of items within the second group of merchandise;

storing, in a second POS terminal, a copy of the second merchandise data;

receiving an externally inputted merchandise code into the second POS terminal;

searching at least one of the first merchandise data or the second merchandise data based on the externally inputted merchandise code;

retrieving a merchandise name corresponding to the externally inputted merchandise code in accordance with the searching;

communicating data representative of a sale of a selected item of one of the first and second groups of merchandise from the second POS terminal to the first POS terminal;

amending the first count data when the selected item belongs to the first group of merchandise;

amending the second count data when the selected item belongs to the second group of merchandise;

selectively comparing the first count data and the second count data;

selectively updating, as a result of the comparing, the second merchandise data with the first merchandise data in the event that an item in the first group of merchandise has a larger frequency of sales than that of an item in the second group of merchandise; and selectively communicating the second merchandise data from the first POS terminal to the second POS terminal.

12. The method of claim 11 further comprising the step of selectively updating, as a result of the comparing, the first merchandise data with the second merchandise data in the event that an item in the second group of merchandise has a smaller frequency of sales than that of an item in the first group of merchandise.

13. The method of claim 11 wherein the first merchandise data is stored in a center file means of the first POS terminal, and further comprising the steps of:
   storing a copy of the first merchandise data in a center buffer of the first POS terminal;
   searching the center buffer when the second POS terminal requests the first merchandise data; and
   searching the center file means if no corresponding merchandise code is found in the center buffer means.

14. The method of claim 13 further comprising the steps of updating the center buffer means in accordance with data representative of first merchandise retrieved from the center file means.

15. The method of claim 14 further comprising the steps of:
   selectively deleting, in accordance with the first count data, merchandise data registered in said center buffer means representative of items having a small frequency of sales; and
   registering merchandise data, representative of retrieved merchandise, into said center buffer means.

16. The method of claim 11 further including the steps of generating a count signal representative of a frequency of sales of items in at least one of the first and second groups of merchandise in accordance with a number of accesses to at least one of the center file means and the local buffer means by the second POS terminal.

17. The method of claim 11 further comprising the step of generating a count signal representative of a frequency of sales in accordance with a number of items sold at each POS terminal.

18. The method of claim 11 further comprising the steps of:
   copying the second merchandise data into an additional local buffer means of the first POS terminal; and
   searching at least one of the additional local buffer means and the center file means based on an externally input merchandise code to retrieve a merchandise name which corresponds to the merchandise code.

* * * * *